June 20, 1939.　　　G. G. SOMERVILLE　　　2,163,439

ARC WELDING

Filed Oct. 16, 1936

Inventor:
Gareth G. Somerville,
by Harry E. Dunham
His Attorney.

Patented June 20, 1939

2,163,439

UNITED STATES PATENT OFFICE 2,163,439

ARC WELDING

Gareth G. Somerville, Pittsfield, Mass., assignor to General Electric Company, a corporation of New York Application October 16, 1936, Serial No. 105,860

3 Claims. (Cl. 219—10)

My invention relates to arc welding and more particularly to that type of arc welding in which the side of an electrode having a flux coating of electrically insulating material is applied to the work parallel to the line of welding and in which the welding operation proceeds automatically in accordance with the consumption of the electrode by the welding arc. For convenience this type of arc welding is often referred to as "self-operating" in view of the fact that the welding operation proceeds automatically once the welding arc has been started and the electrode has been properly positioned along the line of welding.

It is an object of my invention to provide an improved procedure for more effectively performing a self-operating arc welding operation in which the positioning of the electrode on the work is controlled by a welding operator.

It is a further object of my invention to provide an electrode of improved construction which is particularly suited for carrying into effect this process of welding.

Further objects of my invention will become apparent from a consideration of the following description taken in connection with the accompanying drawing and its scope will be pointed out in the appended claims.

Figure 1:
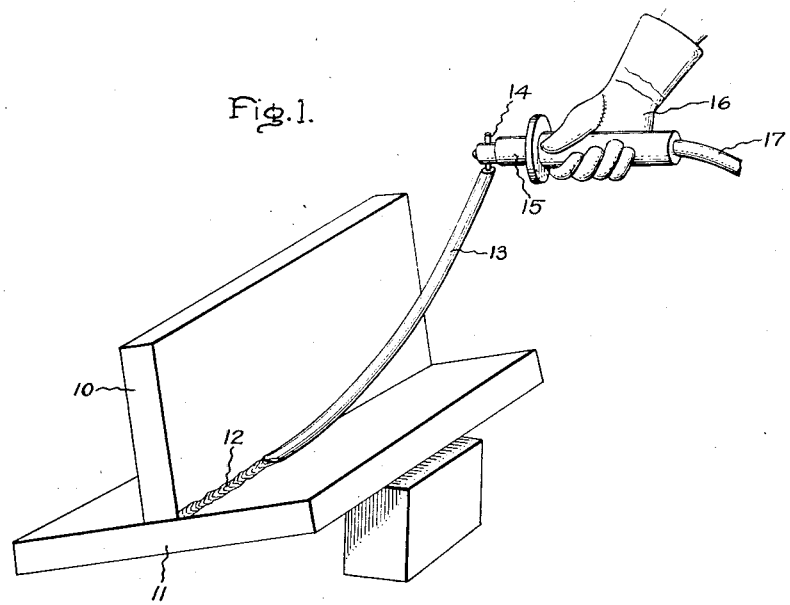
Figure 2:
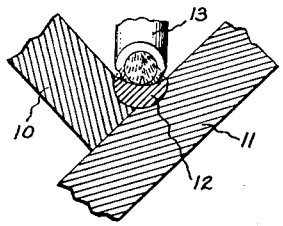
Figure 3:
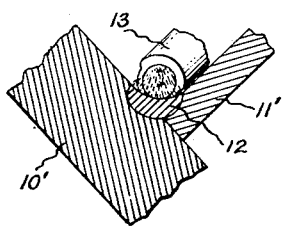
Figure 4:
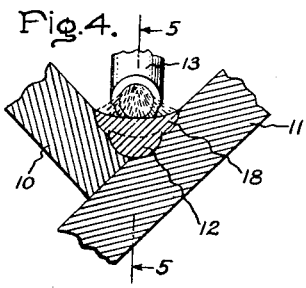
Figure 5:
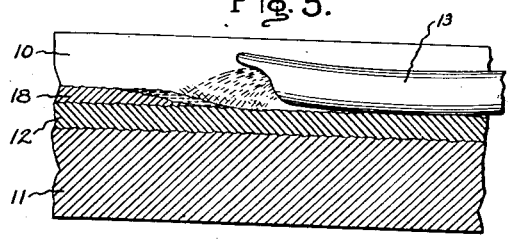
Figure 6:
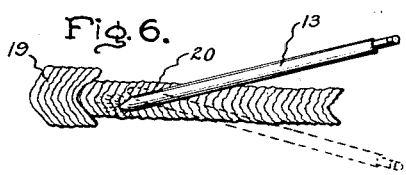

Fig. 1 is a perspective view illustrating generally my procedure of welding and the electrode employed therefor; and Figs. 2, 3, 4, 5 and 6 are detail views illustrating the relationship of the electrode to the work when performing the several acts constituting my improved welding procedure. Fig. 5 is a side sectional view along lines 5—5 of Fig. 4, Figs. 2, 3 and 4 are end views of Fig. 1, and Fig. 6 is a plan view of the welding operations.

In Fig. 1 the work parts 10 and 11 are being joined by a fillet weld 12 through the agency of a welding electrode 13. This electrode is substantially uniformly curved and has an electrically insulating flux coating thereon. Its end 14 is bared of flux and held in an electrode holder 15 supported in the hand 16 of the welding operator. Current is supplied to the electrode through its bared portion 14 by means of a conductor 17 which connects the electrode clamp of the electrode holder 15 to one terminal of a source of supply the other terminal of which is connected to the work parts.

During welding the operator holds the convex side of the curved electrode 13 against the work in the manner illustrated and, as the welding operation proceeds, progressively applies the electrodes to the work along the line of welding holding it throughout the welding operation in substantially the same relative position illustrated. The bared end portion 14 of the electrode is turned up so that this procedure may be followed until all of the coated portion of the electrode has been consumed. The turned-up portion also facilitates a twisting or tilting movement of the electrode to rotate its arcing terminal portion about its longitudinal axis which is used to direct the welding arc where the coating on the electrode is of such a nature to form during welding a hood over the welding arc.

A hood over the welding arc may be obtained by using an electrode whose flux coating is less readily consumed on its concave side than on its convex side. The coating may be of uniform thickness and of different composition on its convex and concave sides so that it is consumed less readily by the welding arc on its concave side than on its convex side. If a flux coating of uniform composition is employed, the hood may be obtained by making the flux coating of greater thickness on the concave side of the electrode than on its convex side. This electrode construction is shown in Figs. 2, 3 and 4 of the drawing.

It frequently becomes necessary because of the different sizes or the different fusing temperatures of the work parts to direct the arc against the larger work part or the work part having the higher melting point. This direction of the arc may be obtained by using an electrode with a hood producing flux coating and by tilting it as shown in Fig. 3 so that the arc is directed more forcefully against the work part 10' which is of greater size than the work part 11' to which it is being connected by weld 12. Where the work parts 10 and 11 are of substantially the same size as shown in Figs. 1 and 2, the arc may be directed equally against each part as illustrated in Fig. 2.

It also becomes necessary when forming a weld of desired size to deposit more than one layer of weld metal. In Figs. 4 and 5 a second layer of weld metal 18 is being deposited upon a layer 12. Unless the action of the welding arc is suitably spread, this second deposit may have a convex surface portion the edges of which unite imperfectly with the metal of the work parts 10 and 11 producing an ineffectual union between the parts. By using a curved electrode and rocking the electrode backward a slight amount, the length of the welding arc may be increased and the desired spreading action of the arc obtained for producing a deposit the edges of which are of substantial thickness and firmly connected to the work parts. This procedure is illustrated in Figs. 4 and 5. The curved shape of the electrode also makes it possible to rock the electrode in a forward direction about its convex side and decrease the length of the arc to obtain desirable arcing conditions where a gap or depression is encountered in the line of welding. The curved construction of the electrode also facilitates the twisting or tilting operation above described by which the arc may be turned in a lateral direction. Furthermore, when making fillet welds such as illustrated there is usually a shoulder or some other obstruction at the end of the line of welding and the use of a curved electrode makes it possible properly to locate the electrode without interference with such obstruction.

The curved shape of the electrode also makes it possible to swivel it about its point of contact with the work and thus oscillate its arcing end portion across the line of welding to obtain a much wider bead of weld metal than would otherwise be possible. This operation has been illustrated in Fig. 6 where by repeatedly swiveling the electrode 13 between its full and dotted line positions as the welding operation proceeds, a wide bead of weld metal 19 may be readily deposited. Without this swiveling operation the width of the bead would be as shown at 20 over which bead 19 is being deposited. Welds 19 and 20 are fillet welds of the character shown in Figs. 1 to 5 inclusive.

The welding operation may be started by touching the end of the electrode to the work prior to placing its side against the work in its operating position or by completing the welding circuit when the electrode is in its operating position through the agency of a bridging conductor of carbon or the like. The thickness of the flux coating on the convex side of the electrode normally determines the length of the welding arc which may be controlled by rocking the electrode during welding. Either alternating or direct current may be employed but alternating current is preferred because the arc is less disturbed by magnetic conditions resulting from the flow of the welding current through the electrode and work parts or their support. The size of the electrode determines the size of the weld since the weld is laid down inch for inch of electrode consumed.

When making a fillet weld, it is not always necessary to tilt the work parts as illustrated in the drawing. This tilting, however, frequently becomes necessary or desirable where the pool of weld metal is quite fluid. The fluidity of the weld metal will depend largely on the nature of the flux coating on the electrode and the value of the welding current used. It will also in some measure depend upon the materials of the electrode and of the work parts being welded.

Although an electrode having a flux coating thereon forming during welding a hood over the welding arc is necessary for obtaining a lateral direction of the arc, it is not necessary for controlling the length of the welding arc since this operation depends solely upon the curved structure of the electrode. An electrode operating with a hooded flux extension at its arcing terminal will however prevent spattering of welding metal and make it possible to obtain the combined advantages of control of arc length and the control of the lateral direction of the welding arc.

My invention may be used for either fillet or butt welds. Extremely long electrodes may be handled with ease since one end of the electrode is always resting on the work. The speed of welding will depend upon the consumption of the electrode which in turn will depend upon its nature and the amount of welding current employed. No welding experience or previous training is needed by the operator since the process is so simple that unskilled labor may be taught to weld in this manner in a few hours.

What I claim as new and desire to secure by Letters Patent of the United States is:

1. The method of electric arc welding which comprises progressively applying to the work parallel to the line of welding the convex side of a curved electrode having an electrically insulating flux coating thereon which during welding is progressively consumed, establishing an arc between said electrode and the work, and rocking said electrode along its convex side to control the length of the welding arc.

2. The method of electric arc welding which comprises progressively applying to the work parallel to the line of welding the convex side of a curved electrode having an electrically insulating flux coating thereon which during welding is less readily consumed on its concave side than on its convex side, establishing an arc between said electrode and the work, and rotating said electrode about the longitudinal axis of its arcing terminal portion to direct the welding arc in a lateral direction.

3. The method of electric arc welding which comprises progressively applying to the work parallel to the line of welding the convex side of a curved electrode having an electrically insulating flux coating thereon which during welding is less readily consumed on its concave side than on its convex side, establishing an arc between said electrode and the work, rotating said electrode about the longitudinal axis of its arcing terminal portion to direct the welding arc in a lateral direction, rocking said electrode along its convex side to control the length of the welding arc, and swiveling said electrode about its point of contact with the work to oscillate the welding arc across the line of welding.

GARETH G. SOMERVILLE.